UNITED STATES PATENT OFFICE.

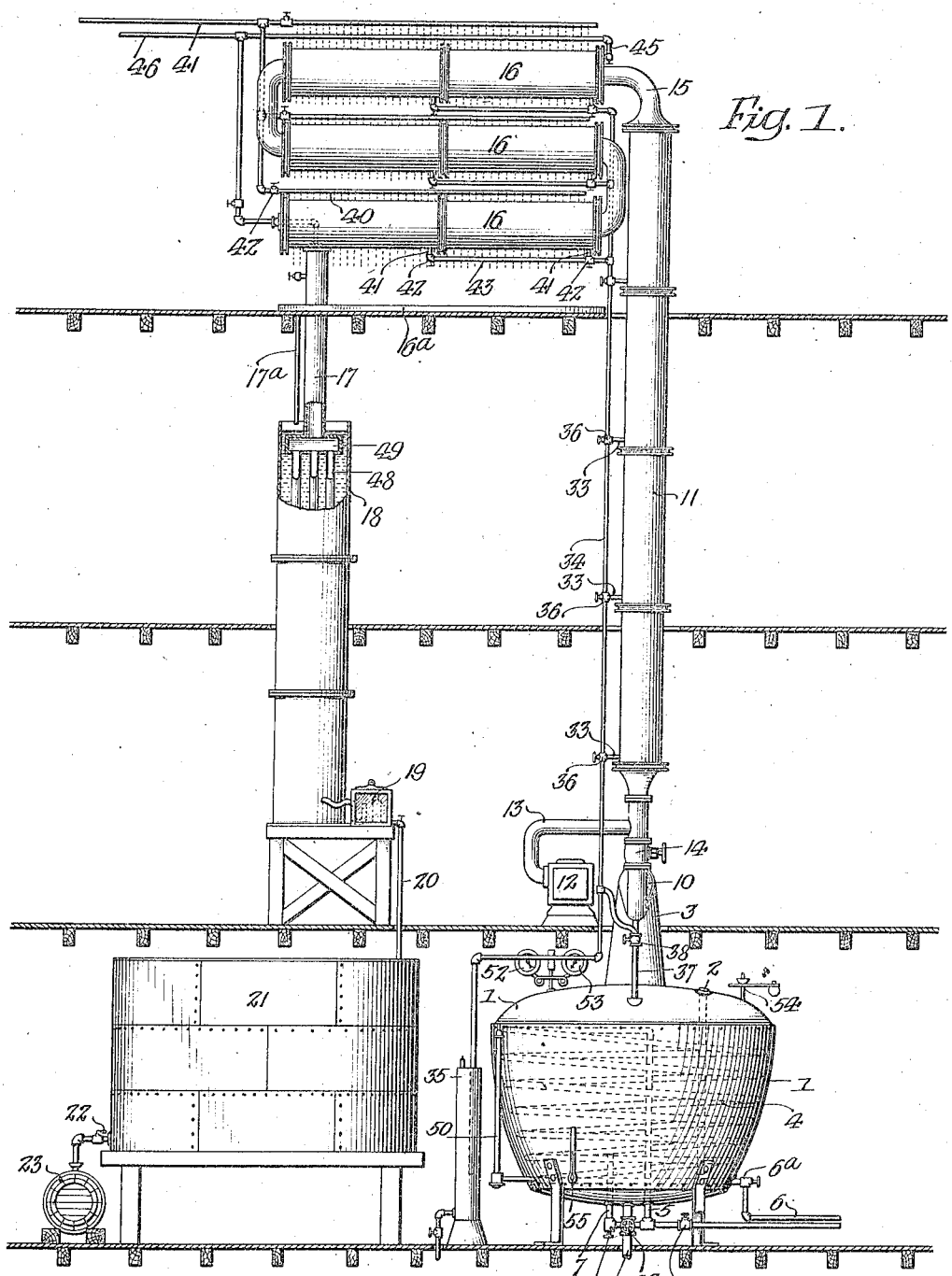

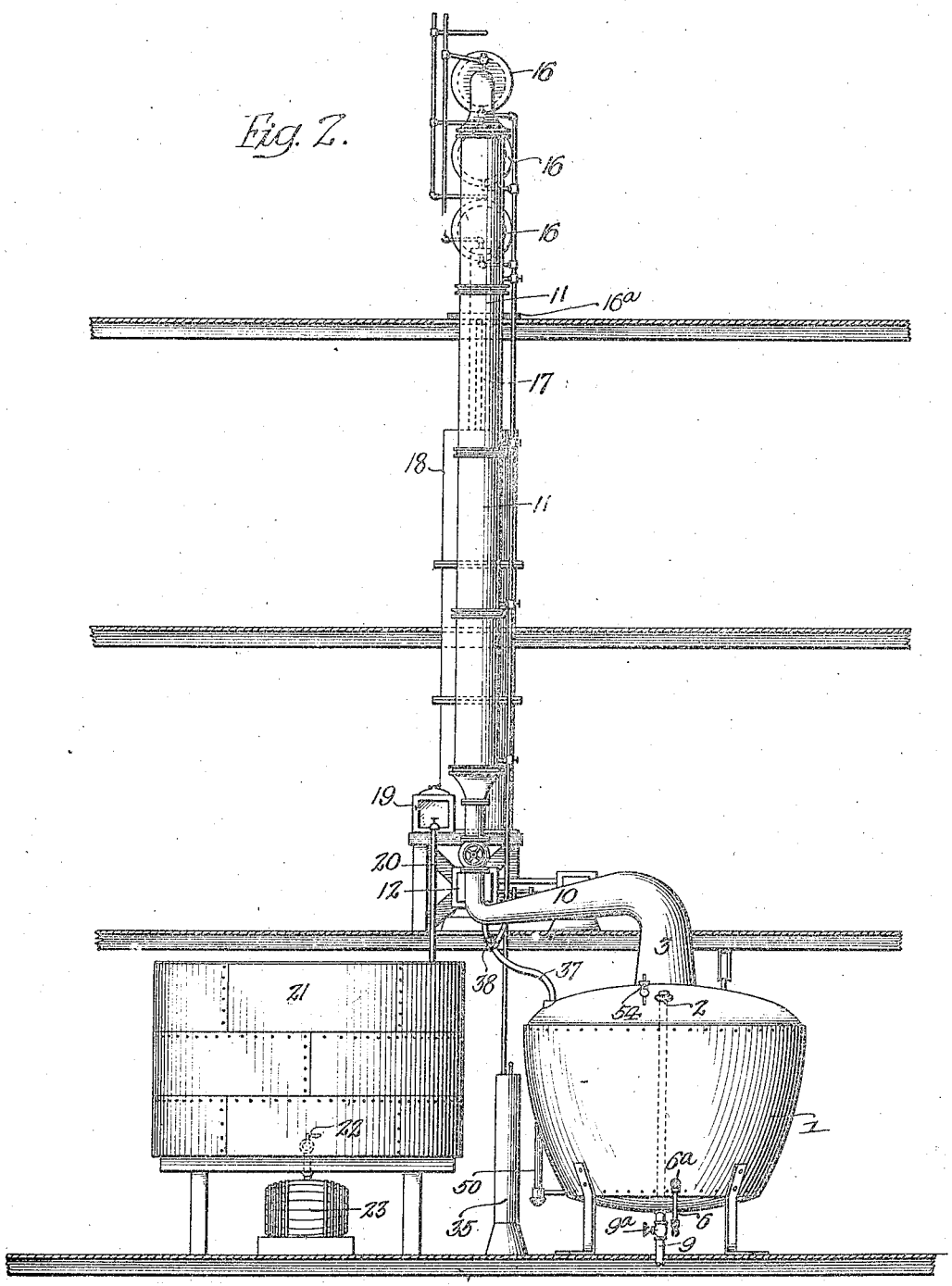

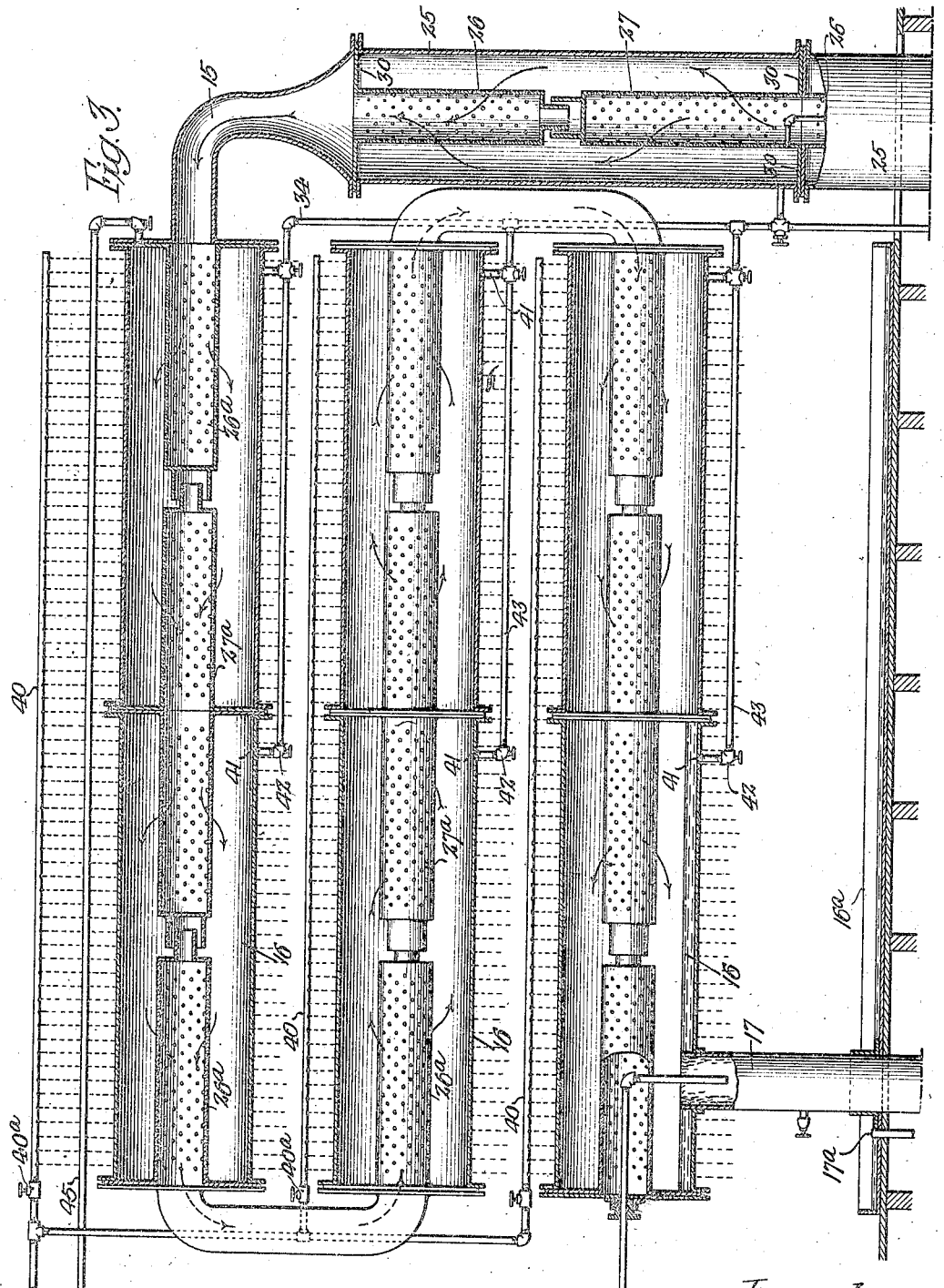

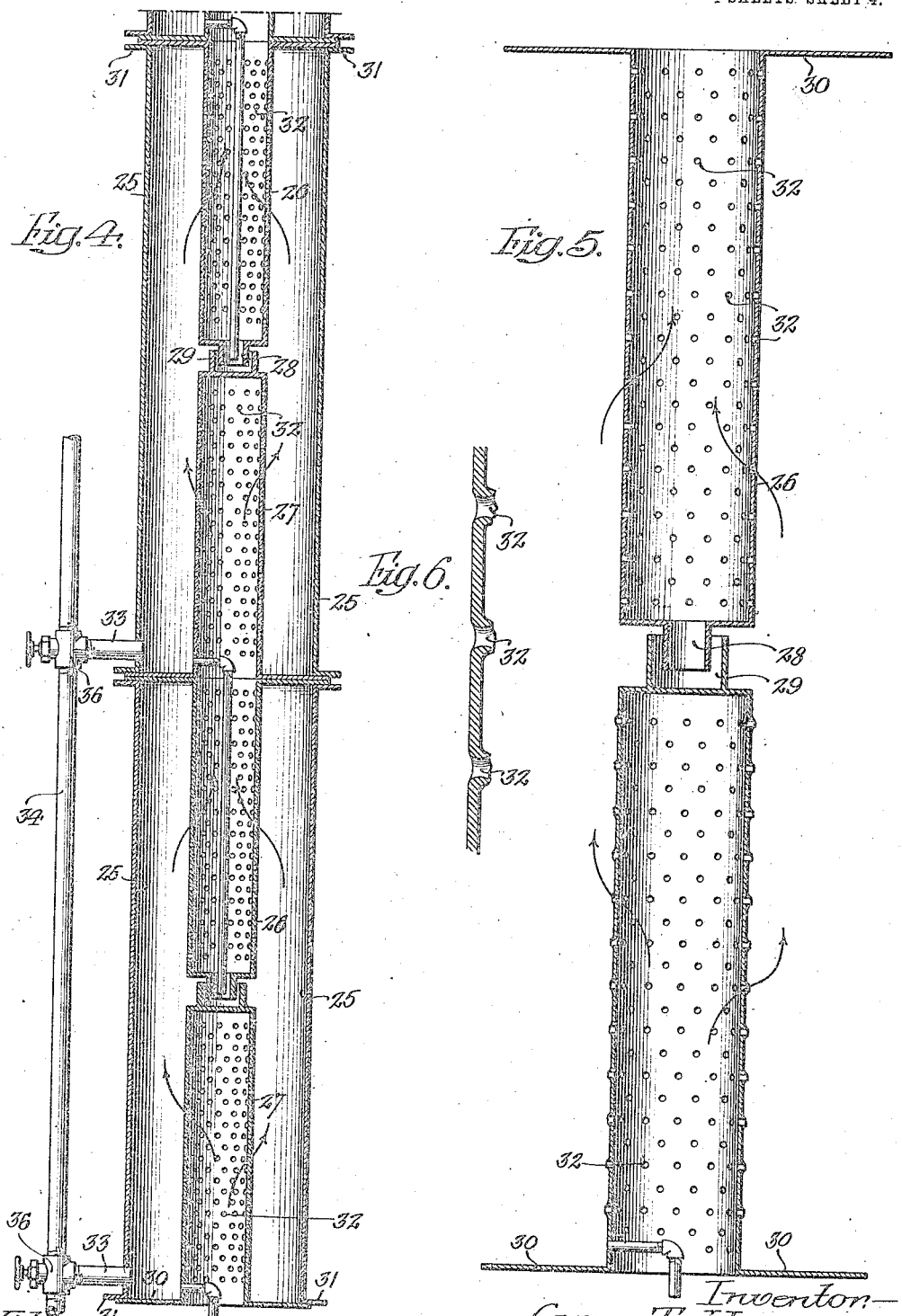

CYRUS T. HANNA, OF PHILADELPHIA, PENNSYLVANIA.

DISTILLING APPARATUS.

1,102,910.   Specification of Letters Patent.   Patented July 7, 1914.

Original application filed October 14, 1909, Serial No. 522,640. Divided and this application filed April 12, 1912. Serial No. 690,228.

*To all whom it may concern:*

Be it known that I, CYRUS T. HANNA, a citizen of the United States, residing in Philadelphia, Pennsylvania, have invented certain Improvements in Distilling Apparatus, (being a division of my application for patent for process of and apparatus for distilling, filed October 14, 1909, Serial No. 522,640, now Patent No. 1,029,363, issued June 11, 1912,) of which the following is a specification.

My invention relates to the art of distilling spirituous bodies, and it consists of an improved apparatus in which the process set forth in the above entitled application can be carried out; the object of my invention being to provide an apparatus in which I can effect the removal of a greater percentage of the undesirable materials condensable at high temperatures from the vapor whereby I am enabled to obtain a purer product than has been produced in the operation of methods or apparatus heretofore in use. These and other features of my invention will be more fully pointed out hereinafter, reference being had to the accompanying drawings, in which:

Figure 1 is a front elevation, partly in section, of a distilling apparatus embodying my invention; Fig. 2, is a side elevation of the structure shown in Fig. 1; Fig. 3, is a sectional view on an enlarged scale of the upper portion of the apparatus shown in Fig. 1, and Figs. 4, 5 and 6, are enlarged sectional views illustrating details of my invention.

In carrying out the improved method or process of distilling in the use of the improved apparatus forming the subject-matter of my present invention, and as set forth in my application and patent before referred to, I separate from the spirit vapor coming from the still, which may be a pot still, a chambered still, a continuous still, or a still of any other suitable type, all of the undesirable materials condensable at high temperatures, before the portions designed to be recovered as the final product and condensable at low temperatures are liquefied, and either re-distill the liquid containing such undesirable materials, or dispose of it in any suitable manner out of contact with the purified and low temperature condensation product which I desire to obtain as the finished product from the operation of my improved method or process.

In the use of my improved apparatus, the vapor is conducted in a vertical column through special forms of internally disposed chambers which are so arranged and constituted that the vapor must pass out of one chamber through small apertures in the wall of the same having entangling means, then into the next succeeding higher chamber through apertures of similar character in the wall of the same having entangling means; such sinuous flow of the vapor being continued to a certain height and then diverted to a series of horizontal elements of substantially the same character, in which the vapor is passed in and out of apertured chambers in the same manner in which such vapor is passed through the chambers of the vertical column and from the horizontal elements, in which some of the spirit purified to the extent desired may be condensed, the vapor is discharged; further condensation being effected in an ordinary form of condenser situated below the horizontal chambers, and to which the vapor, with any condensation thereof, is directed.

In the horizontal chambers referred to, I may introduce a heating medium for the purpose of maintaining a high temperature to sustain the low temperature condensation products in a vaporous condition therein, or if the operation of the apparatus is such that the removal of the desired quantity of impurities has been or can be effected in the vertical column, I may introduce a cooling medium into the horizontal elements. In either instance, such heating or cooling medium may be in the form of air, steam or gas. I also provide means for dripping fluid upon the exterior surface of the horizontal elements, which fluid may be hot or cold water, as may best fulfil the object sought to be attained, which depends entirely upon the character of the vapor discharging into the horizontal elements, and whether or not I desire to continue it in a substantially vaporous condition until it reaches the final condenser for the finished spirit disposed exteriorly of said horizontal elements.

An essential feature of my invention resides in the construction I have adopted for conducting the vapor from the heating vessel whereby I am enabled to condense the undesirable materials which liquefy at temperatures differing from and higher than that required to liquefy the purified spirit vapor; a further feature being the provision of means for introducing gaseous or vaporous bodies, hot or cold, into the horizontal vapor conductor, as may be necessary to raise or lower the temperature therein to insure the condensation of the undesirable materials, and the carrying over of the condensable portions forming the finished product, or the condensation within said horizontal elements of substantially all of the vapor discharged therein, when and at such times as said vapor may be of the character or purity desired to form the finished product. Such condition may be augmented or created by the application of the external heating or cooling medium flowing over the outer surface or wall of said horizontal elements.

In the drawings herewith, 1 represents the heating vessel of a suitable form of still, which may be of any approved type or design, having an inlet 2 for the mash material, and an outlet or beak 3 for the vapor developed by cooking such mash. The vessel 1 may be heated to cook the mash by an internal steam coil 4; the inlet and outlet connections or couplings for such coil being shown at 5 and 6, provided with suitable valves 5ᵃ and 6ᵃ. In some instances it may be desirable to introduce live steam directly into the vessel 1 for contact with the material therein, and for this purpose the steam inlet connection 5 may be extended as indicated at 7, and provided with a suitable valve 8, so as to be cut into and out of communication with the vessel 1. An outlet or drain from the vessel 1 is shown at 9, provided with a valve 9ᵃ.

The beak 3 communicates with a pipe or connection 10 through which vapor from the vessel 1 passes to an elongated cylindrical column 11. If desired, the apparatus may be operated under vacuum; a pump 12 being provided for the purpose, and in such instance the vapor may pass to the pump for delivery to the column 11 by way of a suitable by-pass 13; a valve 14 being employed to control the flow of vapor from the vessel 1 to the column 11 and divert such vapor to the by-pass. The column 11 communicates by means of a suitable elbow section 15 with horizontally disposed vapor conducting elements 16 placed some distance above the heating vessel 1 of the still, and through these conducting elements 16 the vapor is passed back and forth and finally discharged through a suitable pipe 17 to a condenser 18. From the condenser, the liquefied spirit may pass through a tail box 19, having the usual testing instrumentalities, and a pipe 20 leading therefrom to a receiving cistern 21, from which it may be drawn off through a spigot 22, to barrels 23, or it may be barreled directly from the pipe 20.

The vapor conductors of the column 11 are fully shown in the enlarged sectional views, Figs. 4 and 5. The column 11 may consist of cylindrical shells 25 mounted one above another, within each of which are disposed a pair of cylinders 26 and 27, and each upper cylinder 26 may have a reduced outlet 28 at its lower end entering an enlarged cup 29 carried by the closed upper part of each cylinder 27. These cylinders 26 and 27 may have flanges 30 whereby they may be held between the flanged ends 31 of the cylindrical shells 25, and they are apertured at 32, in the manner shown clearly in Figs. 5 and 6, such apertures being preferably made by punching holes through the walls of said cylinders. The holes are relatively close together and the edges of said holes are left rough, just as made by the punch, in order to afford additional means of entanglement for the impurities condensable from the vapor at high temperatures. Other forms of foraminous or reticulated cylinders may be used, provided entangling means are employed. The vapor travels in the direction indicated by the arrows, and passes through the apertures in the cylinders 26 and 27 from the smooth surfaced wall of the same to the roughened surface formed by the raised edges of said apertures, so that the condensable portion of the emerging vapor tending to flow with such vapor at the point of emergence is caught by the roughened edges and broken up; separating from such vapor and flowing down the walls of the cylinders.

Vapor from the heating vessel 1, entering the column 11 passes into the lower inner cylinder 27, thence through the apertures of said cylinder to the space between its outer wall and the wall of the cylindrical shell 25, thence to the cylinder 26, which communicates directly with the succeeding cylinder 27, and so on. By this means, the vapor is given a sinuous or circuitous path, and by passing through the large quantity of small apertures of the several cylinders 26 and 27 in both directions and contacting with the entangling means adjacent said apertures, greater opportunity for removing the impurities condensable at high temperatures is provided.

The impurities forming the products of high temperature condensation flow down the outer walls of the cylinders 26 and 27 and may pass through outlets 35 from each cylindrical shell 25 of the main column 11, which outlets are connected to a pipe 34 leading to a residue collector 35. A certain portion of these condensed impurities also pass down the inside of the cylinders 26 and 27 and fill the cups 29, sealing the lower ends 28 of the cylinders 26, and the overflow from said cups runs down the outside of said cylinders and collects in the bottom of the chambers formed by the cylindrical shells 25 and the flanges 30 of the cylinders 26 and 27. The spirit vapor, therefore, while it may have to pass through films of, or in close contact with particles of, condensed vapor, does not have to pass through bodies of the same as in the ordinary forms of dephlegmators. The condensed impurities entering the pipe 34 from the outlets 33, which flow may be controlled by valves 36, may be returned to the heating vessel 1 of the still through a pipe 37, suitably valved at 38, or sent into the residue collector 35. In addition, if desired, certain portions of the condensed impure products collecting in the shells 25 may pass from one chamber to the next through pipes 38$^a$ interiorly disposed with respect to the cylinders 26 and 27.

When the vapor reaches the top of the vertical column or conductor 11, it passes through the elbow connection 15 to a series of horizontal vapor conducting elements 16 of a design similar in all respects to those of the vertical column; the outer walls of which may be cooled or heated, as the conditions may require, by water dripping from perforated pipes 40, as shown in Figs. 1, 2 and 3, such water being supplied from a pipe 41. The pipes 40 are valved at 40$^a$ so that any one or all may be cut out, as desired. The impurities condensed in said conducting elements 16 may be discharged through outlets 41$^a$, valved at 42, which outlets lead to horizontal pipes 43 connected to the pipe 34, while the spirit vapor passes to the several conducting elements through the elbow connections 44, and from the lowest element it overflows into the pipe 17, and enters the condenser 18.

The conducting elements 16 contain cylinders 26$^a$ and 27$^a$ of the same character as those indicated at 26 and 27 and disposed within the cylindrical shells 25. This is largely a matter of convenience to avoid the necessity of having several forms of the apertured cylinders, since the portions providing the liquid seal when vertically arranged, have no real function when disposed in a horizontal position. In some instances it may be desirable to introduce air, steam or other gaseous bodies into the conducting elements 16, and for this purpose I provide pipes 45 leading to said elements from a pipe 46 leading from a suitable source of supply. As shown one pipe 45 communicates with the upper elements 16, and it will be understood that other pipes 45 may be connected to the other elements. The pipes 45 are valved at 47 so that communication with the conducting elements may be controlled, and in some instances cut off. One of the pipes 45 may communicate with the pipe 17 leading to the condenser. The condenser comprises a cylindrical vessel having tubes 48 leading from a header 49, to which the pipe 17 is connected. The condenser vessel 18 is filled with water, supplied from a suitable source and this cools the tubes 48. The drip from the conducting elements 16 is caught by a pan 16$^a$ and overflows via a pipe 17$^a$ to the water space of the condenser. By valving the several pipes for carrying off the impurities condensed at high temperatures, the discharge and direction of discharge of such impurities may be changed at will, and any one of the cylindrical shells 25 may be drained independently of the rest.

The heating vessel of the still is provided with the usual accessories, such as a contents gage 50, thermometer 51, vacuum gage 52, pressure gage 53, safety valve 54, vacuum valve 55, and other fittings, all of which are well known and familiar to those skilled in the art and need no detailed description herein.

I claim:

1. In a distilling apparatus, the combination of a source of spirit vapor, a vapor conductor leading therefrom, said conductor consisting of a series of cylindrical shells coupled end to end, a series of foraminous shells within said vapor conductor and into which said vapor passes, said shells having closed upper ends and flanges which form chambers within the vapor conductor, each chamber having an upper and lower portion of said shells whereby the vapor entering therein must pass in and out of said foraminous shells, the high temperature condensation products remaining behind and collecting at the bottom of said shell and chambers, and means for conducting and condensing the low temperature condensation products of such vapor.

2. In a distilling apparatus, the combination of a source of spirit vapor, a vertically disposed vapor conductor leading therefrom, said conductor consisting of a series of cylindrical shells coupled end to end, a series of foraminous shells within said vapor conductor and into which said vapor passes, said shells having closed upper ends and flanges which form chambers within the vapor conductor, each chamber having an upper and lower portion of said shells whereby the vapor entering therein must pass in and out of said foraminous shells, the high temperature condensation products remaining behind and collecting at the bottom of said shell and chambers, a horizontal conductor having a series of chambers in vapor communication with said vertical conductor, foraminous shells disposed in said horizontal conductor for the passage of vapor, means for cooling said horizontal conductor, and a condenser for the spirit vapor delivered by said conductor.

3. In a distilling apparatus, the combination of a source of vapor, a vertical conductor leading therefrom, said conductor consisting of a series of cylindrical shells coupled end to end and forming chambers, a series of foraminous shells within said conductor and forming entangling means, said shells having flanges forming the tops and bottoms of the conductor chambers, the tops of said foraminous shells being closed while the bottoms are open, and cupped tops carried by the foraminous shells and forming liquid seals for the open bottoms of the succeeding shells.

4. In a distilling apparatus, the combination of a source of vapor, a vertical conductor leading therefrom, said conductor consisting of a series of cylindrical shells coupled end to end and forming chambers, a series of foraminous shells within said conductor, said shells having flanges forming the tops and bottoms of the conductor chambers, the tops of said foraminous shells being closed while the bottoms are open, cupped tops carried by the foraminous shells and forming liquid seals for the bottoms of said shells, pipes for draining the chambers, and pipes for draining the foraminous cylinders.

5. In a distilling apparatus, the combination of a still, a vapor conductor leading therefrom, partitions dividing said conductor into chambers, a series of foraminous shells within said vapor conductor and into which said vapor passes, said shells being disposed in said chambers and arranged to give the vapor a circuitous path, a series of horizontal vapor conductors, partitions dividing said conductors into chambers, foraminous shells therein for the passage of the vapor in a circuitous path, means for cooling said horizontal conductors, and a condenser for the spirit vapor.

6. In a distilling apparatus, the combination of a source of spirit vapor, a vertical vapor conductor leading therefrom, said conductor consisting of a series of cylindrical shells coupled end to end, a series of foraminous shells within said vapor conductor and forming entangling means into which said vapor passes, said shells having flanges which form with the cylindrical shell chambers within the vapor conductor, and the shells extending in the upper and lower portions of said chambers whereby the vapors entering the chambers must pass in and out of said foraminous shells, the high temperature condensation products remaining behind and collecting at the bottom of said shells and chambers, liquid seals for the lower ends of said shells, a horizontal conductor having a series of chambers in vapor communication with said vertical conductor, foraminous shells disposed in said horizontal conductor for the passage of vapor, means for cooling said conductor, a condenser for the spirit vapor delivered by said horizontal conductor, pipes for the delivery of high temperature condensation products from the vapor conductors, and means for forming liquid seals at the lower ends of the foraminous shells.

7. In a distilling apparatus, the combination of a vapor conductor having chambers, one portion of said conductor being vertically disposed while another portion is horizontally disposed, foraminous shells within the chambers of the several portions of said conductor for inducing liquefaction of impurities condensable at high temperatures, and means for commingling a gaseous fluid with the spirit vapor for the purpose of modifying the temperature and making separation within the chambers of said conductor.

8. In a distilling apparatus, the combination of a source of vapor, a vertical conductor leading therefrom, said conductor consisting of a series of cylindrical casings coupled end to end and forming chambers, a series of foraminous shells within said conductor and forming entangling means, said shells having flanges forming the tops and bottoms of the conductor chambers, the bottoms of said foraminous shells being open, closed cupped tops carried by the foraminous shells and forming liquid seals for the open bottoms of the succeeding shells, pipes for draining the chambers, and pipes for draining the foraminous shells.

9. In a distilling apparatus, the combination of a source of spirit vapor, a vapor conductor leading therefrom, said conductor consisting of a series of cylindrical casings coupled end to end and forming chambers, a series of apertured shells within said vapor conductor and into which said vapor passes, said shells lying partly within each of said chambers whereby the vapor entering the conductor must pass in and out of said apertured shells, and entangling means adjacent said apertures, such entangling means being disposed at the point of emergence of the vapor.

10. In a distilling apparatus, the combination of a source of spirit vapor, a vertically disposed vapor conductor leading therefrom, said conductor consisting of a series of cylindrical casings coupled end to end, and a series of apertured shells within said vapor conductor and into which said vapor passes, said apertured shells having closed upper ends and flanges which form chambers within the vapor conductor, each chamber having an upper and lower portion of said shells whereby the vapor entering therein must pass in and out of said apertured shells, and the apertures of said shells having roughened edges on the side from which the vapor emerges forming entangling means to effect liquefaction of the high temperature condensation products.

11. In a distilling apparatus, the combination of a vapor conductor having a plurality of chambers, a series of foraminous shells within the chambers of said conductor and so disposed that the vapor in passing from one chamber to the next must pass into and out of said foraminous shells, and entangling means carried by said foraminous shells at the points of emergence for said vapor, said entangling means being disposed upon one surface of the foraminous shell in one chamber and upon the opposite surface of said shell in the succeeding chamber.

In testimony whereof, I have signed my name to this specification, in the presence of two subscribing witnesses.

CYRUS T. HANNA

Witnesses:
MURRAY C. BOYER,
WM. A. BARR.